United States Patent [19]

Wragg

[11] 4,373,282
[45] Feb. 15, 1983

[54] THIN-PANEL ILLUMINATOR FOR FRONT-LIT DISPLAYS

[75] Inventor: Robert Wragg, Glendora, Calif.

[73] Assignee: Hughes Aircraft Company, Culver City, Calif.

[21] Appl. No.: 268,512

[22] Filed: May 29, 1981

Related U.S. Application Data

[63] Continuation of Ser. No. 106,952, Dec. 26, 1979, abandoned.

[51] Int. Cl.³ .................. G09F 13/18; G09F 13/00; F21V 7/04
[52] U.S. Cl. .................. 40/546; 40/563; 362/31
[58] Field of Search .......... 40/546, 547, 563; 362/26, 29, 30, 31; 427/289, 290; 264/2.6, 138, 139, 2.7, 162

[56] References Cited

U.S. PATENT DOCUMENTS

| | | | |
|---|---|---|---|
| 2,082,724 | 6/1937 | Shelar | 40/546 |
| 2,358,203 | 9/1944 | Best | 40/546 |
| 2,443,561 | 6/1948 | Greenwald | 40/546 |
| 2,566,026 | 8/1951 | Hughes, Jr. | 40/546 |
| 3,023,304 | 2/1962 | Peterson | 362/31 |
| 3,328,570 | 6/1967 | Balchunas | 362/31 |
| 3,808,415 | 4/1974 | Hurst | 362/31 |
| 3,885,144 | 5/1975 | Lewis et al. | 362/31 |
| 4,106,859 | 8/1978 | Doriguzzi et al. | 427/289 |
| 4,285,889 | 8/1981 | Parsons | 40/546 |

FOREIGN PATENT DOCUMENTS 2346795 10/1977 France .................. 40/546

Primary Examiner—Gene Mancene
Assistant Examiner—Michael J. Foycik
Attorney, Agent, or Firm—G. B. Rosenberg; W. H. MacAllister; A. W. Karambelas

[57] ABSTRACT

A device for illuminating a display surface. Light is introduced through an end surface of a transparent substrate having front and back plane parallel opposed surfaces and thereby directed into the interior of the substrate. The back surface is textured with a multiplicity of shallow depressions such as grooves or dimples which have shallow sloped sides. These sides are configured so that light is selectively directed from the interior of the substrate through a limited angle out of the substrate towards a display surface adjacent and coextensive with the back surface of the substrate and away from a viewer observing the display surface through the substrate. The device provides uniform, high contrast illumination of underlying large area graphic displays such as maps, photographs, charts, and the like.

8 Claims, 7 Drawing Figures

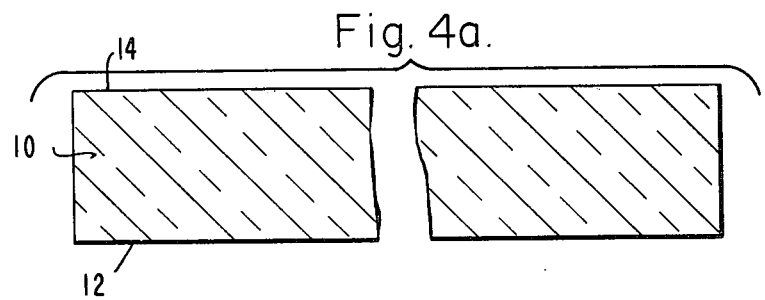
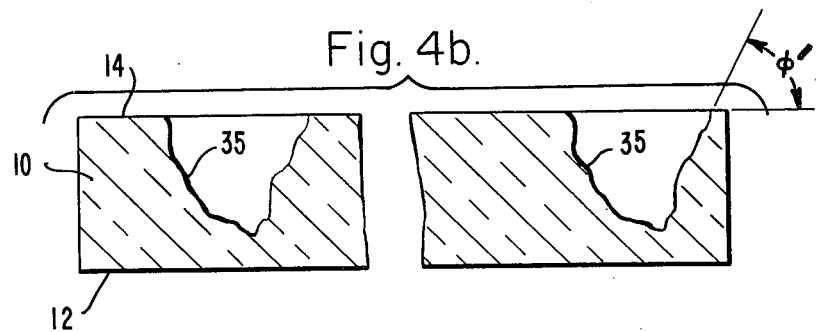
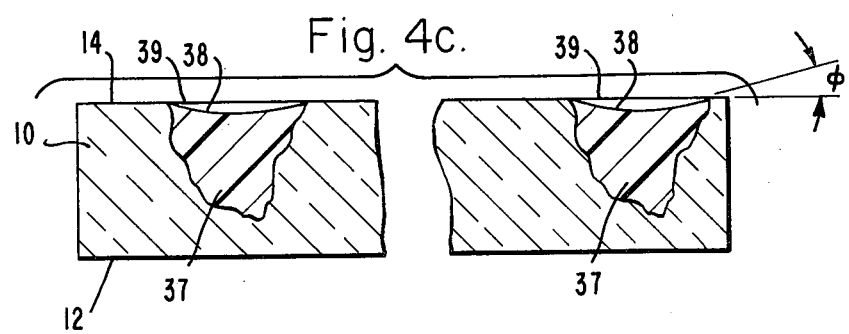

THIN-PANEL ILLUMINATOR FOR FRONT-LIT DISPLAYS

This is a continuation of application Ser. No. 106,952, filed Dec. 26, 1979, now abandoned.

A thin-panel illuminator suitable for high contrast, front lighting of flat, large surface area graphic displays such as maps, photographs, charts and the like and methods of fabrication thereof. Light introduced through one end of a transparent substrate having front and back plane parallel opposing surfaces propagates into the interior of the substrate by total internal reflection. The back surface has a multiplicity of shallow depressions which are shaped to direct light from the interior of the substrate through a limited angle out of the substrate towards a display surface adjacent and coextensive with the back surface of the substrate and, in order to produce a high contrast display, away from a viewer observing the display surface through the substrate.

In one method of fabrication the surface depressions are formed by ruling grooves into the substrate. In another method, the depressions are created by grinding, then partially restoring, the substrate surface.

TECHNICAL FIELD

This invention relates generally to illuminating devices and in particular to thin panel illuminators for high contrast front lighting of flat graphic displays.

BACKGROUND ART

The present invention is directed to an edge-lit thin panel illuminator having a direction selective light diffusing surface suitable for high contrast front lighting of large surface area graphic displays. The method for fabrication of the direction selective light diffusing surface disclosed herein forms no part of this invention but is the subject of a separate application Ser. No. 106,951, now U.S. Pat. No. 4,285,889, filed by J. H. Parsons concurrently with the present application.

In many applications it is desirable to illuminate graphic displays such as maps, photographs, charts and the like under conditions where conventional front lighting is inappropriate. For example, military systems often require viewing of graphic displays under conditions of low ambient light levels such as occur in darkened radar display rooms or aircraft cockpits. For another example, in some display systems, graphics are overlaid with a transparent window which itself contains display nomenclature. In such a system, ambient lighting of the graphics can create specular reflections from the transparent overlay which obscure not only the underlying graphics but also the display symbols on the transparent overlay.

One present approach to avoiding these problems is simply to backlight a transparent graphic display with a translucent diffusing surface such as a ground glass screen behind which is located one or more light sources. While capable of providing good contrast over a large surface, one disadvantage is that opaque graphic displays can not be used with such a display device but must first be converted into transparencies, a time consuming and often expensive process. Furthermore, a relatively large depth dimension is required for mounting the light sources, thus resulting in a bulky device.

In another approach to solving these problems, a thin-panel front illuminator display is achieved by end lighting a wedge shaped transparent panel having polished opposing surfaces. The panel overlies and is in contact with a display surface to be illuminated. A viewer observes the display through the panel at a near normal angle to the display surface. With the light source located at the wide end of the wedge, the panel acts as a light guide confining some of the light by total internal reflection between the opposing non-parallel surfaces. A portion of this confined light escapes symmetrically from both surfaces of the panel at an angle to the surfaces which is a function of the wedge angle of the panel. For a selected small wedge angle, the light escaping from the surface facing the viewer is confined within a sufficiently small angle to the panel surface so as not to be seen by the viewer observing the display. The portion of light escaping from the surface adjacent the display illuminates and is diffused by the display surface. A portion of this diffused light then passes through the panel to reach the viewer. While providing a compact high contrast display, the increasing thickness of the wedge shaped panel with respect to its length creates problems of bulk and viewing parallax which seriously limits the size of the display which can be illuminated.

In another approach to illuminating graphics, end lighting of a transparent planar panel having a partially roughened lower surface is used to front light a graphics display which underlies and is adjacent to the roughened surface. Some of the light trapped between the opposed parallel surfaces of the panel is diffused by the roughened surface and is distributed uniformly in direction through both panel surfaces. Although the light escaping through the lower surface illuminates the graphics display, some of the light escaping through the top surface is directed to the viewer. The viewer thus sees a bright roughened surface overlaying the illuminated display with the unfortunate result that the display has an unsatisfactorily low contrast.

SUMMARY OF THE INVENTION

Accordingly it is an object of the present invention to provide a novel and improved panel illuminator for uniform, high contrast illumination of underlying large area graphic displays such as maps, photographs, charts and the like.

Another object of the present invention is to provide a thin illuminator so as to achieve negligible parallax in a compact device.

Still another object is to provide such a device which can illuminate opaque graphics.

A still further object is to provide such a device which can be cheaply and easily fabricated.

These and other objects and advantages are accomplished in an illuminator in which light is introduced through one end of a transparent substrate having front and back plane parallel opposed surfaces and thereby directed into the interior of the substrate. The back surface is textured with a multiplicity of shallow depressions such as grooves or dimples which have shallow sloped sides such that light is selectively directed from the interior of the substrate through a limited angle out of the substrate towards a display surface adjacent and coextensive with the back surface of the substrate and away from a viewer observing the display surface through the substrate.

The diffusing surface is fabricated by roughening the back surface of the substrate to form relatively deep depressions which are then partially filled with an optically transparent liquid to thereby form relatively shallow depressions. The liquid within the depressions is then solidified.

BRIEF DESCRIPTION OF THE DRAWINGS

These and other objects, advantages and features will become more fully apparent from the following detailed description of the invention when considered in conjunction with the accompanying drawings, wherein like numbers refer to like parts throughout and in which:

FIGS. 4a through 4c are enlarged cross-sectional views of a thin panel illuminator showing the major steps in one method of fabricating the invention of FIGS. 1 through 3.

DETAILED DESCRIPTION OF THE DRAWINGS

Figure 1:
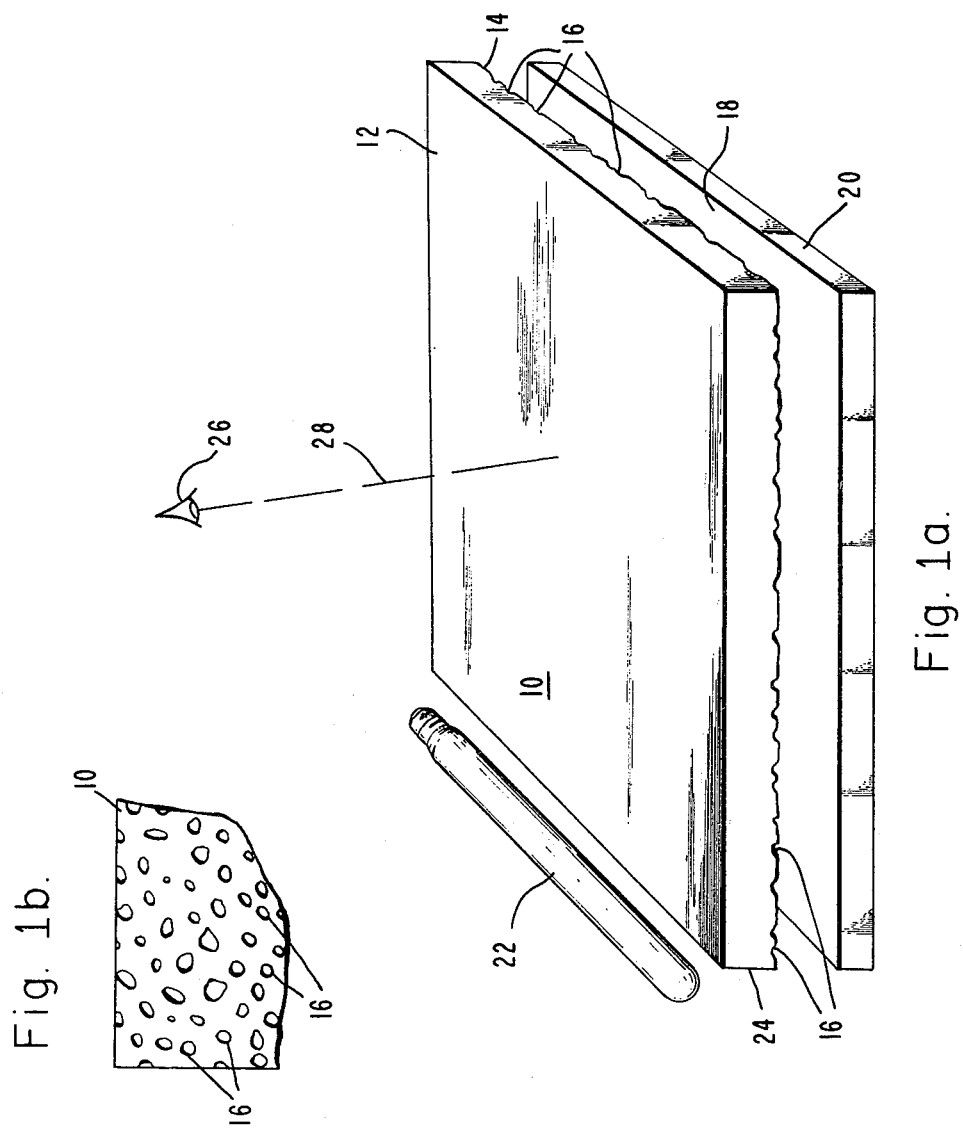
FIG. 1a is an isometric view of the thin panel illuminator according to the invention.
FIG. 1b is an enlarged portion of FIG. 1a showing microscopic depressions.
Figure 2:
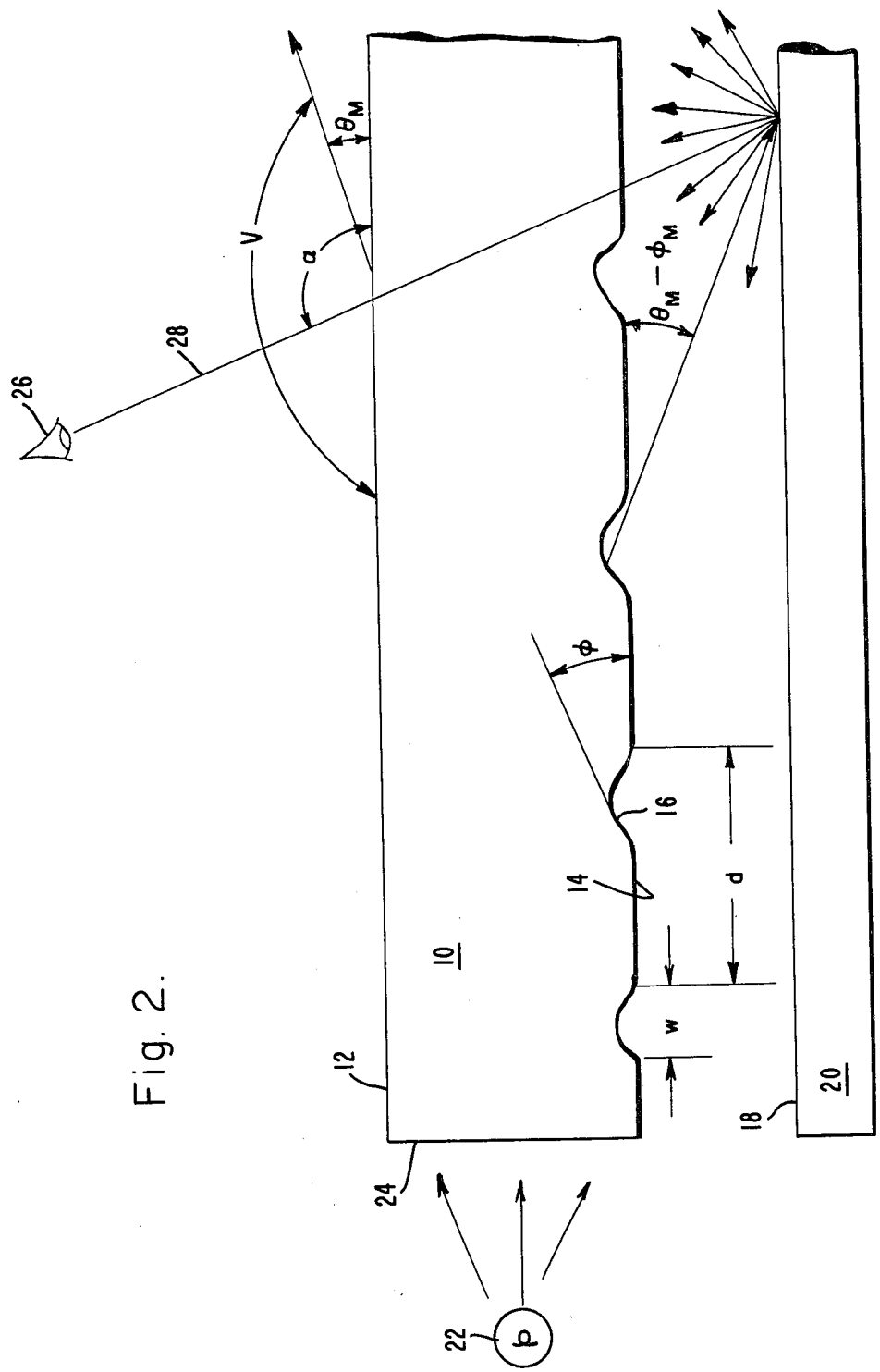
FIG. 2 is a fragmentary cross-section of FIG. 1a, illustrating how light from a light source is selectively directed by the illuminator onto the display surface and away from a viewer.

Referring with greater particularity to FIGS. 1a and 2, a thin panel illuminator according to the invention may be seen to include an optically transparent panel 10 which may be made of either glass or plastic. Panel dimensions are typically $\frac{1}{8}''$ to $\frac{1}{4}''$ in thickness and up to several feet in width and length. The panel 10 is bounded by a top or first major optically polished surface 12 and a parallel opposed back or second major surface 14. A multiplicity of microscopic depressions 16, such as grooves or dimples, each having gently sloping sides of slope angle $\phi$ with surface 14 are formed in surface 14 by one of the processes to be described. The spacing of such depressions can be regular or random. If grooves, their lengths can be oriented either parallel to end surface 24 or have random orientations. If dimples, their distribution on the surface can be regular or random. Display surface 18 of the item 20 to be displayed is positioned in approximate contact, but not optical contact, with surface 14; the ficticiously large gap shown between surfaces 14 and 18 is indicated only for clarity of illustration. Item 20 can be, but is not limited to, graphics on either glossy or matte paper and can consist of any printed or photographic matter formed on virtually any type of opaque or transparent material, provided only that the display matter is not completely specular, i.e., it can diffuse at least some incident light.

Referring now to FIG. 2, light from the source 22 that radiates through the polished end surface 24 of the panel 10 can bounce back and forth between surfaces 12 and 14 by the process of total internal reflection and traverse throughout the panel 10. However, some of the traversing light strikes the depression 16 and in so doing some of that light is refracted through surface 14 onto the display surface 18, where it is diffused so that at least some of the light reaching display surface 18 is directed to the eye 26 of the viewer looking along the line of sight 28.

Another portion of the light striking depression 16 is reflected by depression 16 upwardly to escape from surface 12 within an angular region having maximum angle $\theta_m$ to the surface 12. As shown in FIG. 2, angle $\theta_m$ is smaller than the angle $\alpha$ between the line of sight 28 and surface 12 so that the light is not seen by the viewer 26. Therefore, the viewer sees only light injected into the panel from source 22 which has been diffused from the display surface 18 with the desired result that surface 14 is essentially invisible so that a high contrast display is observed.

On the other hand, if the display were viewed at an angle $\alpha$ which is smaller than the escape angle $\theta_m$, then the viewer would simply see a bright surface 14 which obscures the underlying display surface 18. It follows from the foregoing that the display surface 18 has good contrast when viewed at any angle $\alpha$ within angle V, where angle V is the supplement of $\theta_m$ relative to surface 12.

As will be described in greater detail, $\theta_m$ is an increasing function of depression slope angle $\phi$. Therefore if a given application requires that the display be viewed over an angle V which is large, then the slope angle $\phi$ must be kept small so that upwardly escaping light is directed away from the viewer.

It will be recalled that display surface 18 is in close but non-optical contact with panel surface 14. Placing these surfaces in this type of contact eliminates an otherwise translucent appearance of surface 14, thereby preventing any loss of display resolution.

Display resolution is further maintained by keeping the depressions smaller than the eye can resolve. It has been found that grooves having a width of 0.001" or less are satisfactory for this purpose.

To keep all of the light injected through end 24 from escaping within the first few inches of its traversal through panel 10, the width W of the grooves must be much smaller than the intergroove separation d. For graphics on the order of 1 to 2 feet on a side, the ratio of width to spacing W/d should be considerably smaller than unity, a satisfactory value being approximately 1.5. Of course, the smaller the ratio, the smaller is the amount of light diverted onto display surface 18 but the greater is the uniformity of illumination across the display. Therefore the ratio of groove width to spacing, W/d, is a trade-off between uniformity and intensity of illumination on the surface 18.

By fabricating the depressions so that spacing d decreases with increasing distance from end surface 24 through which light from source 22 is injected, this trade-off can be advantageously avoided so that uniform display illumination is combined with the maximum display intensity.

Figure 3:
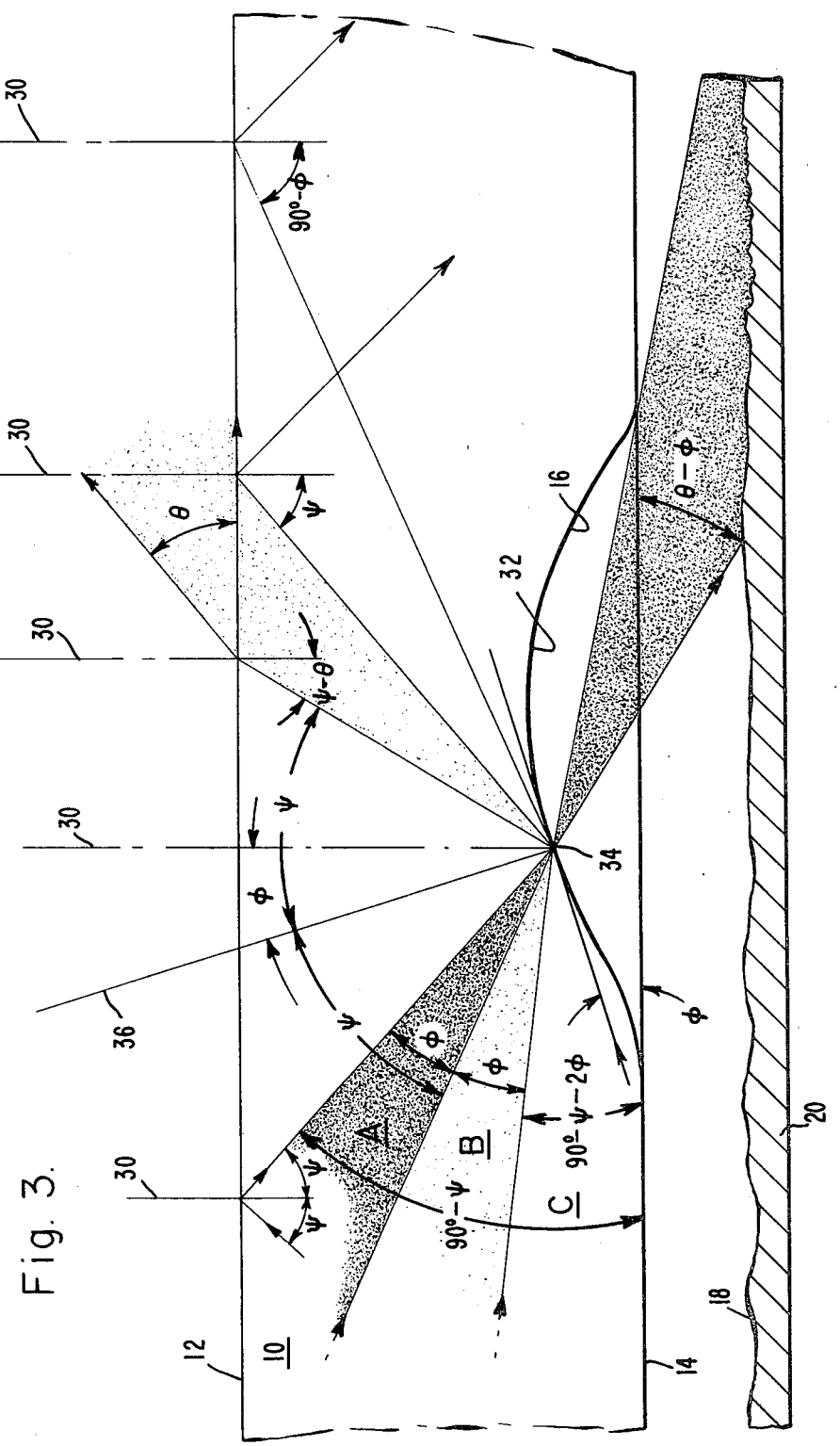
FIG. 3 is an enlarged portion of FIG. 1 illustrating how light entering the panel interacts with the textured surface adjacent the display.

Referring now to FIG. 3, there is shown a greatly enlarged portion of FIG. 2 to illustrate how light entering the panel interacts with a representative depression 16 so as to achieve the above described advantageous illumination. It should be noted that the size of depression 16 with respect to the thickness of panel 10 is shown greatly exaggerated for convenience of illustration. Referring to FIG. 3, it can be shown that only light rays which enter panel 10 from the source 22 (not shown) that make an angle $\psi$ or greater with the normal 30 to surface 12 can be trapped by total internal reflection within panel 10. Angle $\psi$ is defined by the well-known Snell's Law Relationship as $\psi = \sin^{-1}(1/n)$ where n is the index of refraction of the material of panel 10.

It will be apparent from an inspection of FIG. 3 that light from source 22 which is totally reflected within panel 10 propagates within an angle of 90°−ψ to surface 14. The rays within this angle are shown impinging on the surface 32 of depression 16 at a point 34 having a tangential slope angle ψ with surface 14. The rays within the angle 90°−ψ may be subdivided into three angular portions A, B, and C, respectively subtending angles of φ, φ, and (90°−ψ−2φ).

The portion A of light from source 22 impinges upon the depression surface 32 at an angle less than ψ with the normal 36 to surface 32. These rays are therefore refracted and escape through surface 32 at an angle θ−φ with surface 14 (θ being defined below) and impinge upon display surface 18. The slightly rippled display surface 18 represents microscopic irregularities which, as previously described, diffuse at least some of the incident light upwardly through panel 10 along the line of sight 28 of viewer 26 so that the display surface 18 is illuminated.

The portion B of light impinges upon surface 32 at an angle to the surface normal 36 that exceeds the the critical angle ψ such that this light undergoes total internal reflection only at surface 32. Reflecting upwardly, this light impinges upon surface 12 at an angle to surface normal 30 which is less than the critical an angle ψ and thereby escapes through surface 14 at an angle θ. Again applying Snell's Law, it can be shown that θ is given by the expression.

$$\theta = 90° - \sin^{-1}[n \sin(\psi - \phi)].$$

Assuming a maximum depression slope angle of $\phi = \phi_m$, the above equation yields a maximum escape angle of $\theta = \theta_m$. If in a desired application, a minimum viewing angle α of 20° is desired then, as is apparent from the foregoing, $\theta_m$ must be equal to or less than 20°. Solving the above equation for $\theta_m = 20°$ for a panel having an index of refraction of n=1.5 yields a maximum allowable depression slope angle φ=3.0°.

Finally, the portion C of light from source 22 impinges upon surface 32 at an angle to the surface normal 36 that exceeds the critical angle ψ and hence undergoes total internal reflection at surface 32. This light then undergoes successive total internal reflections at surfaces 12 and 14 because the angles of incidence at these surfaces are less than the angle ψ and hence remains trapped until the light either exits through an edge of panel 10 or until a portion of it impinges upon another depression 16 (not shown).

In accordance with one particularly suitable method of fabricating the present invention, depressions having a properly shallow slope angle φ are fabricated by grinding surface 14 and partially filling the ground surface. FIGS. 4a through 4c are a side view of an enlarged portion of panel 10 illustrating the major steps of fabricating the invention depicted in FIGS. 1 through 3. FIG. 4a shows the panel or substrate 10 on which surfaces 12 and 14 have been optically polished. Next, randomly located pits of the approximate size specified below are created in surface 14 by grinding it on a conventional lens grinding machine using a grinding powder such as aluminum oxide having a particle diameter that is small enough to create pits that are not visible to the eye. The grinding powder is formed into a slurry with water as the transport agent. Surface 14 is ground against a tool surface that can be metal, glass or ceramic. This is the customary method of grinding glass for the production of optical surfaces. In practice, a 25 micrometer mesh (diameter) powder has been found to be satisfactory. The grinding is continued until the pits thereby formed cause the surface to become completely translucent. This occurs in grinding times typically ranging from 10 minutes for plastic to 30 minutes for harder types of glass such as pyrex. After grinding is completed, the panel is cleaned with water and air dried. A cross-sectional view of pitted surfaces 14 formed in this manner is shown in FIG. 4b wherein the size of the pits is shown greatly magnified. As indicated in FIG. 4b the slope angle φ″, of the pit walls 35 is objectionably steep.

Next, referring to FIG. 4c, the pits of FIG. 4b are partially filled with a transparent liquid 37 that forms a concave meniscus 38 having its lip 39 flush with surface 14. The surface tension of the liquid 37 is selected so that the meniscus 38 assumes a relatively shallow slope angle φ to surface 14. A suitable filling material should have a low surface tension in order to create a shallow depression profile, a low viscosity in order to penetrate into the pits, an index of refraction which closely matches that of panel 10, and the ability to retain the surface profile of meniscus 38 while hardening to a dimensionally stable solid. One such material is a three component mixture comprising a thinner such as turpentine, boiled linseed oil, and varnish. For a given type of panel 10 material, the relative proportions of the above three components can vary over a wide range. When panel 10 is glass, a satisfactory mixture contains approximately 20% turpentine, 30% boiled linseed oil and 50% phenolic based varnish. After the liquid mixture is poured onto the surface 14, the excess is allowed to drain off and the surface then wiped with a cloth or sponge. Finally, the deposited mixture is air dried for several hours at room temperature to allow the turpentine to evaporate and the mixture to harden by polymerization. The described process has the advantages of being straightforward, inexpensive, quick, and suitable for use with large area panels. Furthermore, the process is versatile in that the index of refraction can be adjusted to match various types of glasses or plastics by varying the constituent proportions of varnish and boiled linseed oil.

It should be understood that the ground surface could alternatively be treated with other materials having the above-described properties such as a clear polyester resin which has been thinned down with a solvent such as acetone.

In another method of fabrication, shallow grooves could be scribed into surface 14 with a ruling machine. However, this method is slower and more expensive than the method described above.

In an exemplary embodiment of the device made with the present invention as described in FIGS. 1 through 4, a glass panel 12″ square and ¼″ thick was end lit by a 40 watt incandescent light source about 12 inches long suitably mounted adjacent end surface 24. Of course, a fluorescent light might have been also used. Items used as display surface 18 included maps and photographs, as well as other graphics formed on both glossy and matte surfaces. The illuminator was found to provide high brightness with excellent contrast and no discernible variation of brightness over the illuminated display surface.

What is claimed is:

1. A front-lit illumination panel for providing directional illumination to a display surface comprising:
   (a) an optically transparent substrate having first and second parallel opposing major surfaces, said first major surface having a multiplicity of irregular depressions therein; and (b) an optically transparent material having an index of refraction closely matching that of said substrate partially filling the depressions in said substrate so as to give each of said depressions a regular concave, meniscus shaped surface, each said depression thereby having gently sloping sides and a relatively shallow slope angle to said first major surface so that light from the interior of said substrate is selectively aimed through either said first or second major surface, the light exiting through said first major surface being directed toward a display surface co-extensive with and adjacent to said first major surface and the light exiting said second major surface being directed away from a viewer observing said display through said substrate.

2. The device of claim 1 wherein said light exiting through said first major surface is within the angle $\theta_m - \phi_m$ and said light exiting said second major surface is within an angle $\theta_m$ where:

$\phi_m$ = maximum slope angle of said depressions, and $$\theta_m = 90° - \sin^{-1}[n \sin(\psi - \phi_m)]$$

where n = index of refraction of said substrate, and $\psi = \sin^{-1}(1/n)$.

3. The device of claim 2 wherein said viewer observes said display at an angle V, where V is the supplement of angle $\theta_m$ relative to said second major surface.

4. The device of claim 1 wherein said depressions in said first major surface are grooves.

5. The device of claim 4 wherein said grooves are oriented in pseudo-random directions.

6. The device of claim 4 wherein said grooves have a width W of 0.001 inch or less and an average inter-groove spacing greater than five times W.

7. The device of claim 1 wherein said depressions are spaced apart by a distance which decreases with their distance from said end surface such that said display surface has substantially uniform illumination with distance from said edge.

8. The device of claim 2 wherein the maximum slope angle ($\phi$m) of said depressions is 3° or less.

* * * * *